United States Patent [19]

Abrams et al.

[11] 4,406,016
[45] Sep. 20, 1983

[54] VHF SENSOR IN-BAND RADIO RELAY

[75] Inventors: Burton S. Abrams; Andrew E. Zeger, both of Wyndmoor, Pa.

[73] Assignee: The United States of America as represented by the Secretary of the Army, Washington, D.C.

[21] Appl. No.: 325,162

[22] Filed: Nov. 27, 1981

[51] Int. Cl.³ .............................................. H04B 7/14
[52] U.S. Cl. ....................................... 455/19; 455/24
[58] Field of Search ...................... 455/19, 24; 375/3

[56] References Cited

U.S. PATENT DOCUMENTS

| 3,566,234 | 2/1971 | Thomson | 455/19 |
| 3,611,139 | 10/1971 | George | 455/24 |
| 3,696,429 | 10/1972 | Tressa | 455/24 |
| 4,317,217 | 2/1982 | Davidson et al. | 455/24 |

FOREIGN PATENT DOCUMENTS 55-133148  10/1980  Japan ..................................... 455/24

Primary Examiner—Marc E. Bookbinder
Attorney, Agent, or Firm—Robert P. Gibson; Jeremiah G. Murray; Michael C. Sachs

[57] ABSTRACT

Disclosed is an in-band, non-sampling, real time VHF radio relay or signal repeater for use in two-way, multi-hop remote sensor data links. Each signal repeater comprises a transceiver which includes interference cancellation circuits for preventing the high level signal produced by the radio repeater's transmitter section from desensitizing the low noise RF amplifier circuitry incorporated in the front end of the radio repeater's receiver section. Such apparatus is utilized to implement a remote sensor data collection network consisting of a plurality of subject radio repeaters and several sensors normally arranged in groups. The data which flows over the relay network can either originate at the sensors and flow to a read out station or it may originate at the read out station and flow to the sensors. Sensor originated information may be either digital or analog, or both, while read-out station originated information is digital only. The relay operates with either analog or digitally-modulated signals. When used with an omnidirectional antenna, it is not direction-preferential.

16 Claims, 7 Drawing Figures

VHF SENSOR IN-BAND RADIO RELAY

The Government has rights to this invention pursuant to Contract No. DAAB07-75-C-0790 awarded by the Department of the Army.

BACKGROUND OF THE INVENTION

This invention relates generally to radio transceiver apparatus and more particularly to in-band, radio relay type transceiver apparatus.

In the deployment of a remote sensor-data collection system it is frequently necessary to include a number of radio repeater sites to overcome the line of sight transmission restrictions, thereby extending the range of data collection. The fundamental problem, however, in implementing any radio relay is in the preventing of the relatively high power signal from the relay's transmitter from being picked up by its own receiver at a level high enough to desensitize it. Prior art radio relays have utilized a variety of techniques to achieve the required transmitter to receiver isolation, for example, a conventional out-of-band relay is implemented with the transmitter frequency $f_t$ and receiver frequency $f_r$ being in different bands and with isolation being achieved by means of fixed $f_t$ and $f_r$ band filters. The problems associated with such an apparatus, however, is the frequency allocation problem which presently has many undesirable restrictions. With respect to the conventional in-band relay system, a relatively large $f_t$ and $f_r$ frequency separation exists between the operational transmit and receive frequencies. However in such apparatus tunable narrow band filters are utilized which become relatively large and expensive and many frequency channels are inherently unusable. Another type of radio relay system known to those skilled in the art is the store and forward relay type of system which alternately receives and transmits each message. The problem associated with this type of system is that the relays require a data storage capability which encounters severe problems where analog data is being stored and also only a 50% receiver duty cycle is possible. Another known type of relay system comprises what is known as a sampling relay wherein the message is alternately received and transmitted at a Nyquist sampling rate. Such a system has an inherent limitation that it is subject to spectrum splatter and loss of isolation in ground environments due to delayed reflections. All of the above noted radio relays typically include a common antenna which is shared by both the transmitter and receiver portions of the relay. Also known are radio relay systems which operate at any transmit and receive frequency but these systems include respective directional antennas which are highly directive. In such systems no omnidirectional coverage is obtainable and the antennas themselves tend to become relatively large at VHF frequencies.

Accordingly, it is an object of the present invention to provide an improvement in radio relay apparatus.

It is another object of the present invention to provide an in-band radio relay apparatus which includes improved isolation between transmitter and receiver.

It is yet another object of the present invention to provide an in-band radio relay apparatus which includes adaptive coherent interference cancellation to prevent the transmitter from desensitizing the receiver during operation.

SUMMARY

These and other objects are accomplished by means of an in-band, non-sampling, real time radio relay or signal repeater apparatus for use in two-way multi-hop remote sensor data links, each signal repeater apparatus having at least one interference cancellation circuit or sub-system in the receiver section which is operable in response to its own transmitted RF reference signal and the received RF signal appearing at a common receive/transmit antenna, whereupon the RF reference signal's phase and amplitude are adaptively adjusted and summed with the received RF signal to effect cancellation of most of the transmitted RF signal appearing at the front end of the receiver. The received RF signal is down-converted to an If signal for narrowband filtering, and then it is up-converted to an offset transmit frequency, amplified to a fixed level, and fed back to the common antenna through a bandpass filter and switched attenuator to provide the RF transmitted signal and from which the RF reference signal is derived. When desirable, further cancellation of the transmitted signal cancellation residue is further provided prior to the RF signal down-conversion. Additionally, DC power is conserved by including an RF signal presence detector means in the receiver portion which operates to enable the DC power supply which is used to power the transmitter portion upon RF signal presence being detected.

DESCRIPTION OF THE PREFERRED EMBODIMENTS

Figure 1:
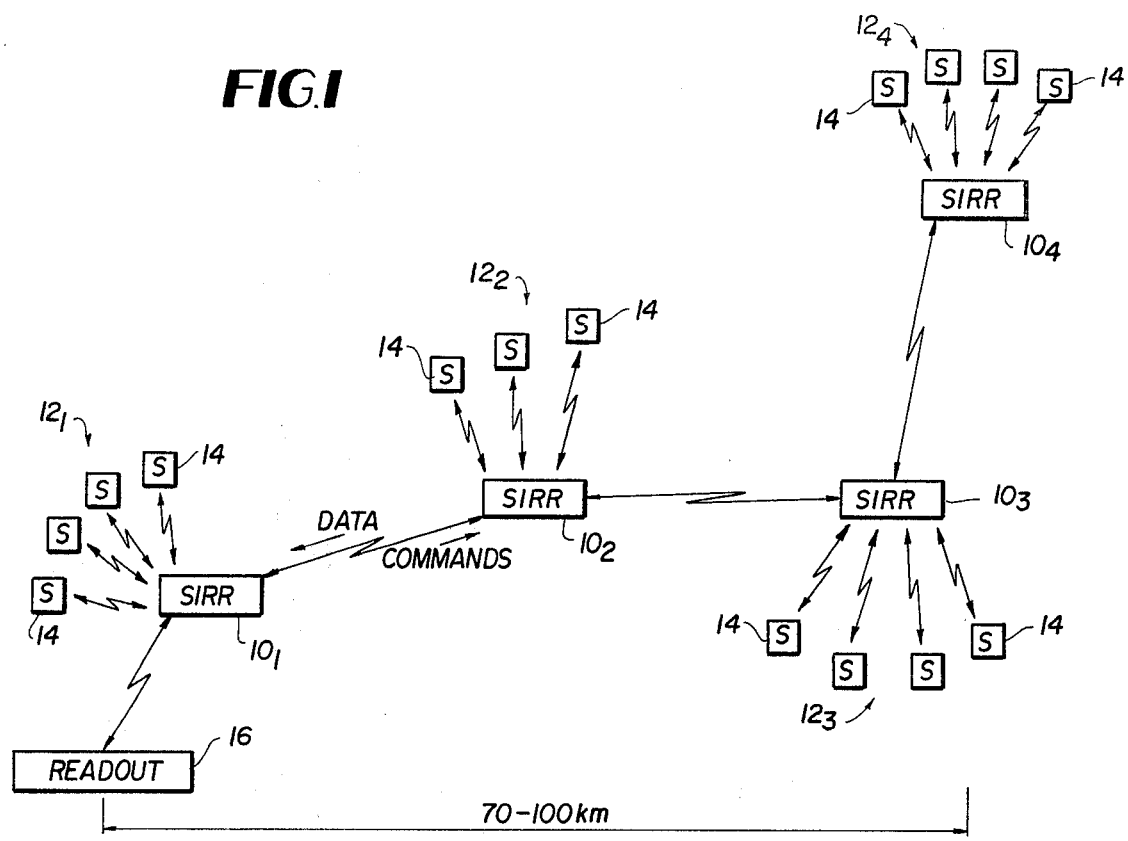
FIG. 1 is a block diagram generally illustrative of a data collection network utilizing the present invention.

Referring now to the drawings wherein like reference numerals refer to like components throughout, attention is first directed to FIG. 1 wherein there is shown diagrammatically a typical remote sensor data collection network comprised of four sensor in-band radio relay (SIRR) units $10_1$, $10_2$, $10_3$, $10_4$ operating with respective sensor groups $12_1$, $12_2$, $12_3$ and $12_4$ each including a plurality of sensors 14. At one end of the network is a read-out unit 16. Information which flows through the repeater network consisting of the units $10_1 \ldots 10_4$ originates at any of the sensor 14 and flows to the read-out unit 16 via one or more relay units or it may originate at the read-out unit 16 and flow to the sensors 14. Sensor originated information is commonly referred to as "sensor data" and may be either digital or analog in nature, or both, while read out unit originated information is commonly referred to as a "sensor command" and is only digital in nature.

Each SIRR unit $10_i$ is designed to relay a signal in the VHF range, offsetting the frequency of retransmission $f_t$ from the frequency of reception $f_r$ by a predetermined amount, i.e. $f_t = f_r \pm \Delta f$. Typically $f_r$ is in the range between 160 MHz and 176 MHz while $\Delta f$ is as much as 16 MHz or as little as 93 kHz. Each SIRR unit $10_i$ relays in real time analog or digital FM signals with a bandwidth of up to 18 kHz. To obtain high forward gain, however, isolation between the transmitter and receiver portions is necessary in order to obtain a stable operation. This is achieved by the use of an adaptive coherent interference cancellation sub-system in combination with narrow band filtering and antenna isolation as will be shown as the present detailed description continues.

Figure 2:
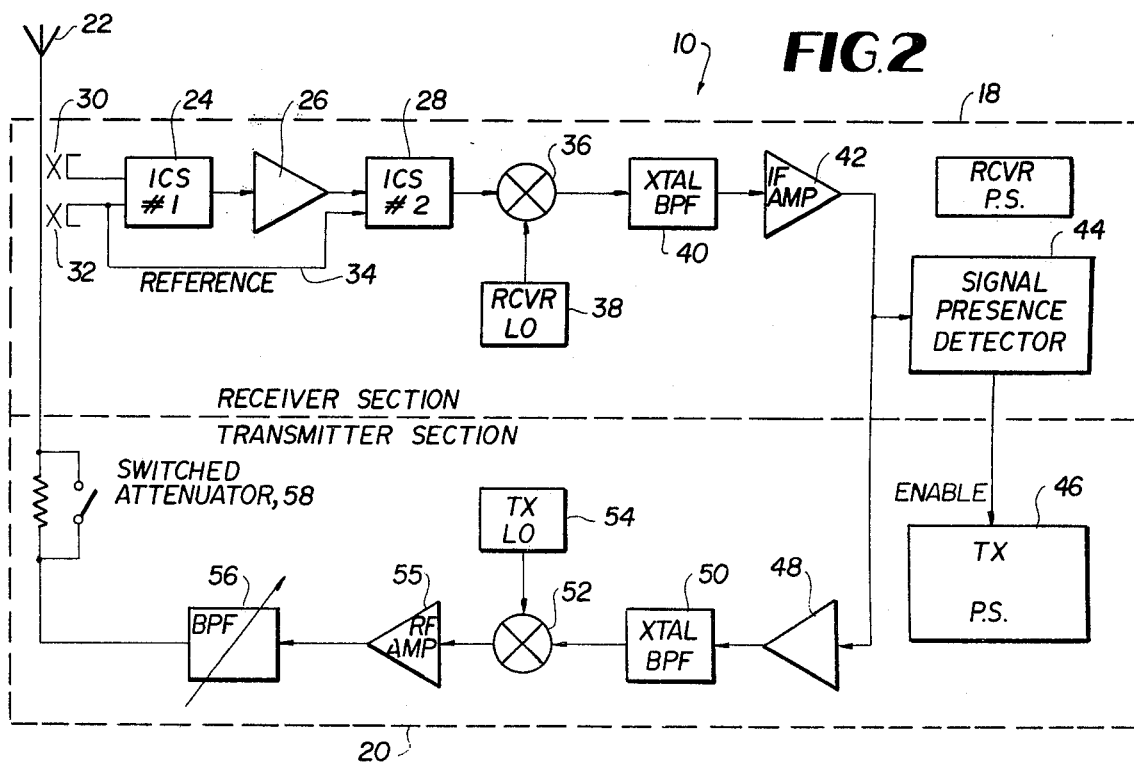
FIG. 2 is an electrical block diagram generally illustrative of the preferred embodiment of the subject invention.

Referring now to FIG. 2, shown therein is a simplified block diagram generally illustrative of one unit 10 of the sensor in-band radio relay (SIRR) units $10_1 \ldots 10_4$ shown in FIG. 1. The SIRR unit 10 is comprised of a receiver section 18 and a transmitter section 20 coupled to a common transmit/receive antenna 22. Considering first the receiver section 18, a first interference cancellation circuit or sub-system 24 is provided in order to prevent the high level RF signal currently being retransmitted by the transmitter section 20 from desensitizing a relatively low noise RF amplifier 26 to the RF signal concurrently being received while a second interference cancellation sub-system 28 is included to provide a further cancellation of any transmitter signal residue not eliminated by the first interference cancellation sub-system 24. Both interference cancellation sub-system 24 and 28 are substantially identical in construction and are shown in detail in FIGS. 3 through 8.

As shown in FIG. 2, however, the first interference cancellation sub-system 24 is coupled to the antenna 22 through a signal coupler 30. Accordingly the received RF signal along with any leakage of the signal being retransmitted as well as any reflections from surrounding terrain is also coupled through the coupler 30. A second signal coupler 32 is utilized and is adapted to provide a transmitted RF reference signal which is also applied to the interference cancellation sub-system 24. As will be shown, the phase and amplitude of this RF reference signal is adaptively adjusted in the interference cancellation sub-system 24 to effect cancellation of the undesired retransmitted signal coming through the coupler 30 without any cancellation of the receive signal appearing thereat. The uncancelled received RF signal plus the residual retransmitted signal are then applied to the amplifier 26 wherein RF amplification takes place. The output of the RF amplifier 26 is fed to the second interference cancellation sub-system 28 along with the transmitted signal reference appearing at the coupler 32 and conveyed via the transmission line 34. As noted earlier, the operation of the second interference cancellation sub-system 28 is to further reduce any residue of the transmitted signal not fully cancelled in the sub-system 24. The output of the interference cancellation sub-system 28 is fed to a signal mixer 36 along with a local oscillator signal generated by a local oscillator 38 whereupon the received RF signal is down-converted to an IF signal where it is fed to a crystal bandpass filter 40 which is adapted to provide channel selectivity with rejection of any out-of-channel signals. The filtered IF signal is next fed to an IF amplifier 42 which is operable to raise the gain of the IF signal to the level sufficient to energize a received RF signal presence detector 44 which is adapted to enable a DC power supply 46 which powers the transmitter section 20 so that prior to any received signal being detected no DC power is applied to the transmitter section 20 in order to conserve power.

After received RF signal presence detection occurs, the IF signal which is simultaneously applied to a second IF amplifier located in the transmitter section 20 is amplified and applied to another crystal bandpass filter 50 in order to confine the system noise to the retransmitted signal channel. The IF signal thus filtered is then up-converted to a selected transmit frequency $f_t$ by being applied to a signal mixer 52 along with a transmitter local oscillator signal generated by the local oscillator 54. The up-conversion local oscillator frequency is selected to offset the RF signal outputted from the mixer 52 by a predetermined increment $\Delta f$ from the originally received signal frequency $f_r$. The output of the mixer 52 is fed to an RF amplifier 55 and then to a bandpass filter 56 where it is coupled back to the common transmit/receive antenna 22 through a switched attenuator 58 which is adapted to provide a high power or low power operational mode. Thus each SIRR unit $10_1 \ldots 10_4$ is adapted to receive an incoming RF signal and then suitably convert the signal to an offset RF frequency and retransmit it over the network (FIG. 1) with the receiver section 18 operating at a 100% duty cycle without being swamped by the signal which is being fed back through the antenna 22 from the transmitter section 20.

Figure 3:
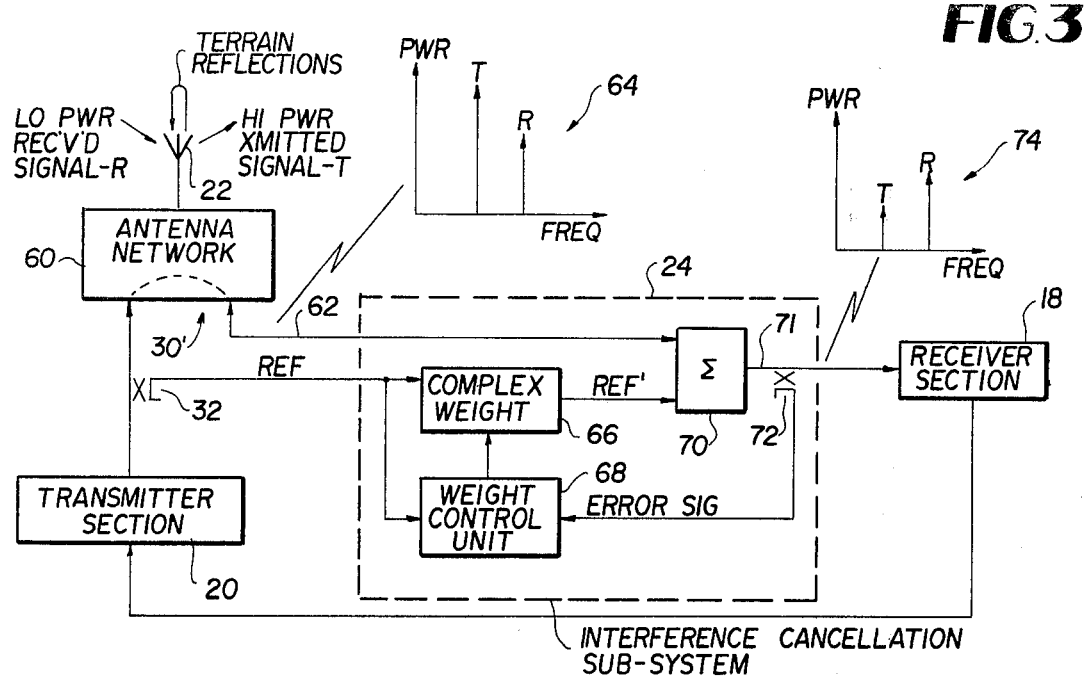
FIG. 3 is an electrical block diagram generally illustrative of an interference cancellation circuit included in the embodiment of the invention shown in FIG. 2.
Figure 7:
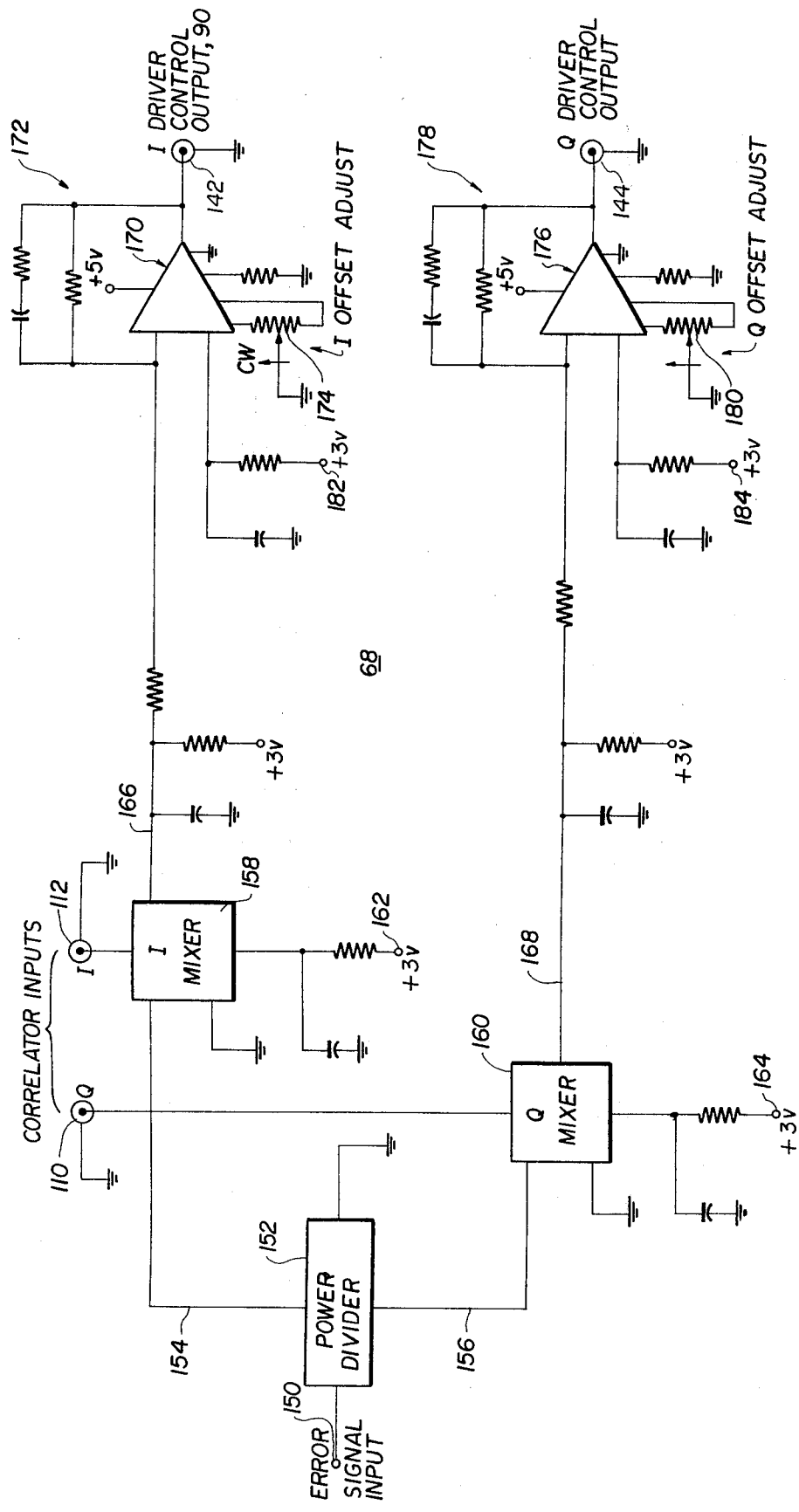
FIG. 7 is an electrical schematic diagram of the complex weight control unit included in the interference cancellation circuitry shown in FIG. 3.

At the heart of the successful operation of each of the SIRR units $10_1 \ldots 10_4$ is the use of at least one interference cancellation sub-system (ICS) 24 to protect the receiver section 18 from interference by the co-located transmitter section 20. The apparatus employed by the subject invention is broadly shown by the block diagram of FIG. 3. Because of imperfect isolation in the antenna network 60 which includes the signal coupler 30 shown in FIG. 2, the voltage standing wave ratio (VSWR) of the antenna 22 and reflections from nearby objects, a small portion T of the retransmitted signal is coupled back into the interface cancellation sub-system 24 located in the receiver via transmission line 62. The power amplitude of the signal T at this point is relatively larger than the received signal R as shown by the graphical illustration 94. Also shown in FIG. 3 is a portion of the retransmitted signal which is coupled to ICS 24 by means of the signal coupler 32. This signal is utilized as an RF reference signal and designated REF. The ICS 24 includes a complex weight circuit 66, a complex weight control unit 68, a signal summer 70 and a directional coupler 72. A weighted reference signal REF' which comprises the signal REF suitably altered in phase and amplitude is outputted from the complex weight circuit 66 where it is algebraically combined with the composite RF signal appearing on line 62 to provide an error signal on line 71 which is fed back to the weight control unit 68. The unit 68 effects the proper setting of the complex weight circuit 66 to allow the signal T to be cancelled while the receive signal R is maintained at the original level as indicated by the graphical illustration 74. The control unit 68 in actuality comprises a complex correlator which is adapted to correlate the error signal from the coupler 72 with the reference signal from the coupler 32 and will be explained when FIG. 7 is considered. Thus the summation circuit 70 is provided with a replica of the retransmitted signal whose amplitude and phase have been adjusted in the complex weight circuit 66 to effect cancellation of the T signal at its output. Furthermore, attenuation via filtering is provided in the complex weight circuit 66 so that noise sidebands placed on the retransmitted signal by circuit noise modulation are reduced so that they also do not desensitize the receiver section 18.

Figure 4:
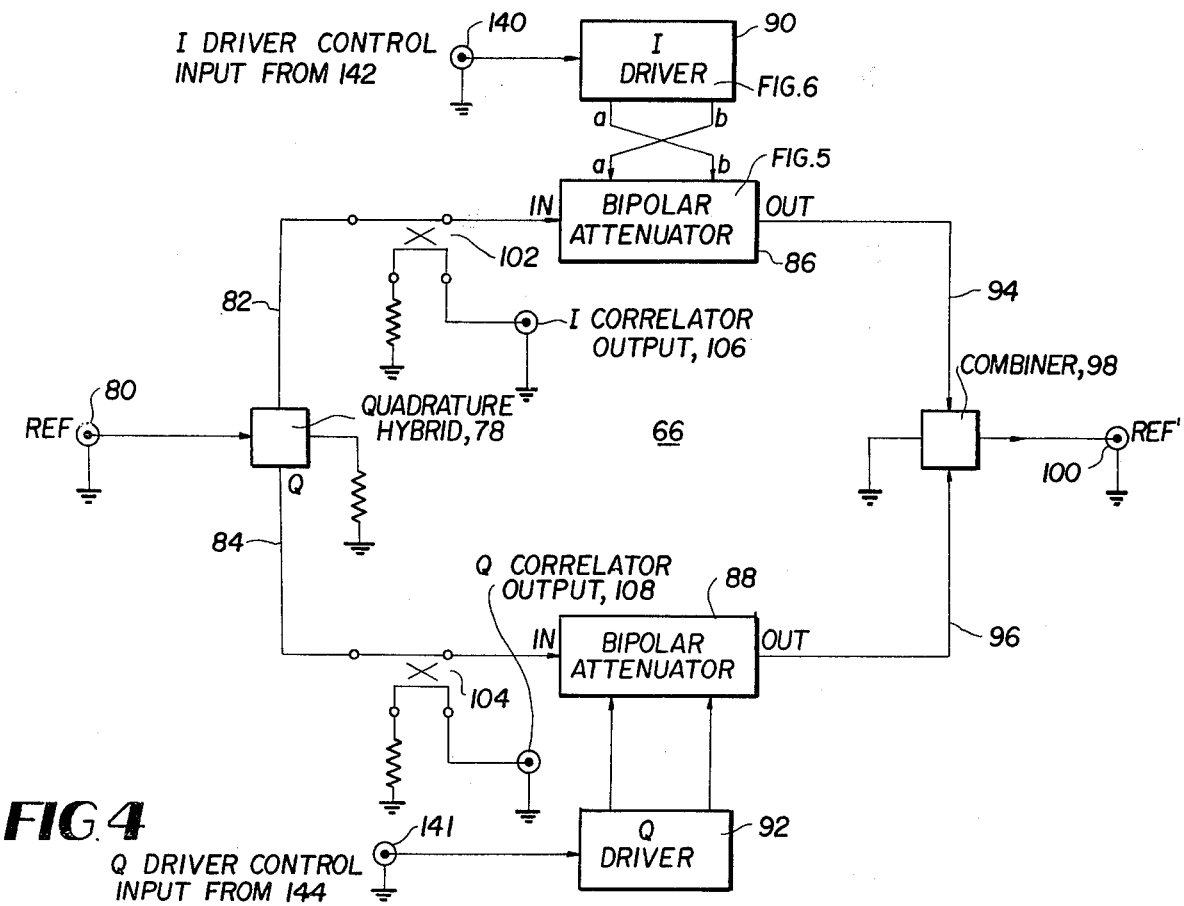
FIG. 4 is an electrical block diagram of the complex weight circuitry shown in FIG. 3.
Figure 6:
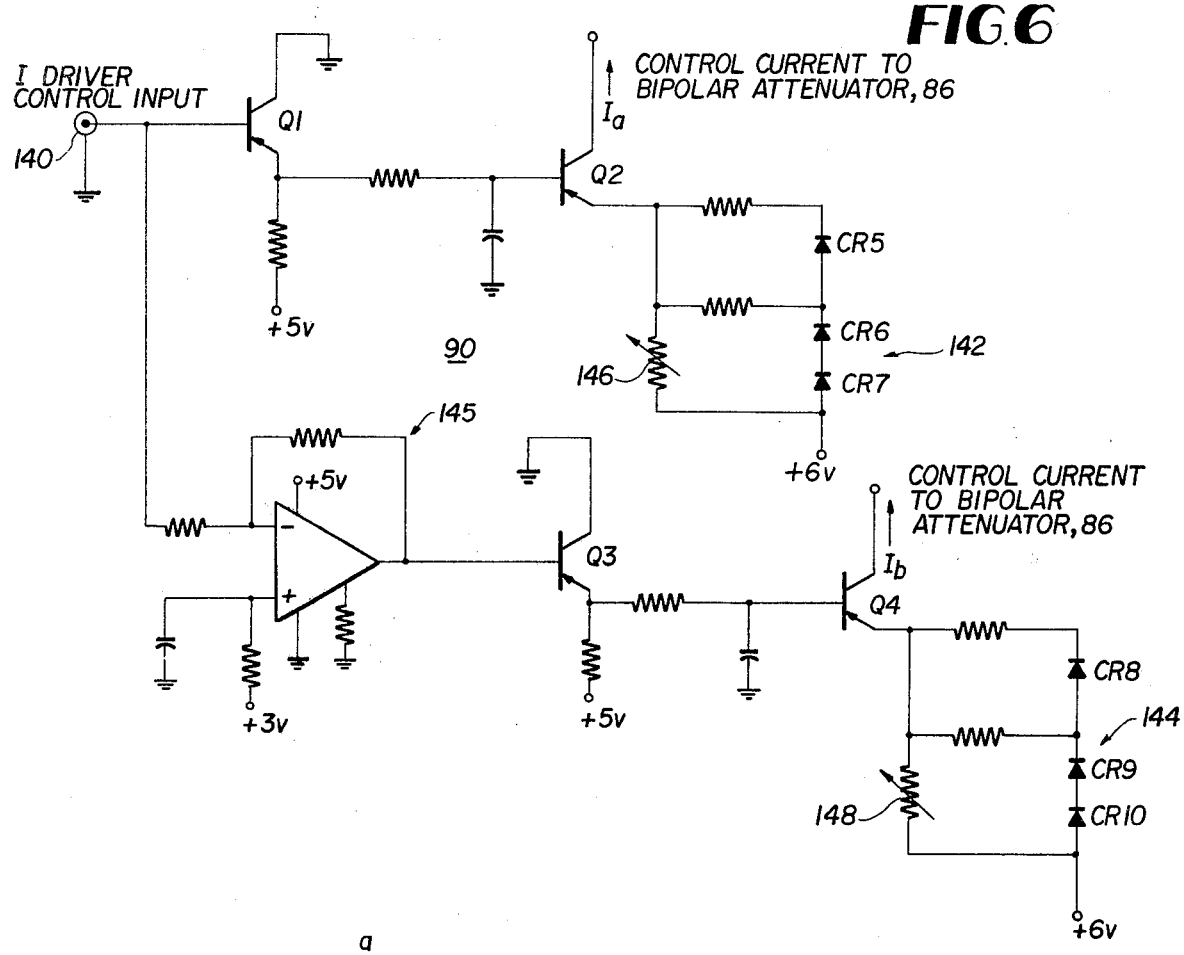
FIG. 6 is an electrical schematic diagram of the driver circuitry utilized for the bi-polar attenuators shown in FIG. 5.
Figure 5:
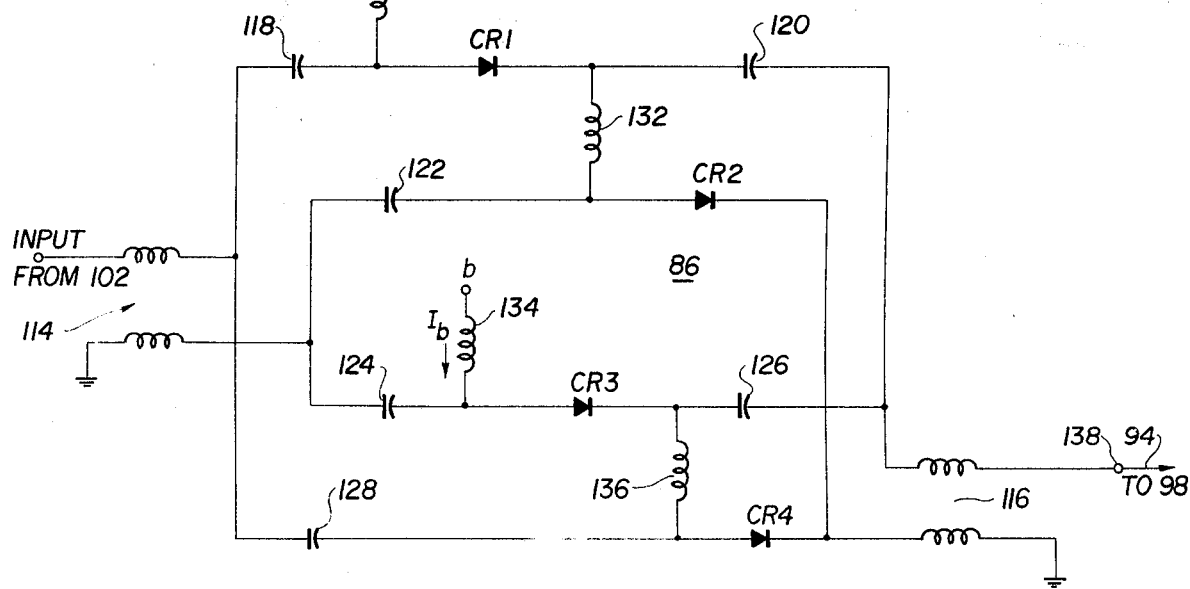
FIG. 5 is an electrical schematic diagram of the bi-polar attenuators included in the complex weight circuitry shown in FIG. 4.

Referring now to the details of the interference cancellation sub-system 24, reference is now made to FIG. 4 where the block diagram of the complex weighting circuit 66 is shown including a quadrature hybrid signal coupler 78 which accepts the RF reference signal REF applied to input terminal 80 and splits the signal into inphase I and quadrature Q component signals which appear on transmission lines 82 and 84. The I and Q reference signals are coupled to respective bi-polar attenuators 86 and 88 whose details are shown in FIG. 5. The bi-polar attenuators 86 and 88 are controlled in accordance with the operation of respective I and Q driver circuits 90 and 92, whose details are shown in FIG. 6. The bi-polar attenuators 86 and 88 operate to adjust their respective inputs in amplitude with either positive or negative polarity and provide output signals on signal lines 94 and 96 where they are then combined in phase in a signal combiner 98 to provide the signal REF' at output terminal 100 which provides an RF signal corresponding to the reference signal REF which is altered in phase and amplitude and applied to the signal summer 70 shown in FIG. 3. In addition to the elements noted, the complex weight circuit shown in FIG. 4 also includes signal couplers 102 and 104 in the I and Q signal lines 82 and 84 ahead of the attenuators 86 and 88 to provide a portion of respective I and Q quadrature signals to terminals 106 and 108 which are adapted to be coupled to the complex correlator shown in FIG. 7 at the input terminals 110 and 112, respectively.

Schematically, the bi-polar attenuators 86 and 88 are identical with attenuator 86 being shown in FIG. 5. The circuitry includes four PIN diodes CR1, CR2, CR3 and CR4 arranged in a bridge configuration between input and output transformers 114 and 116. RF coupling is achieved by means of the capacitors 118, 120, 122, 124, 126 and 128. Bias current is applied to the diodes CR1 and CR2 by means of a driver current $I_a$ applied to terminal "a" by means of inductances 130 and 132. In an identical fashion, bias current is applied to CR3 and CR4 by means of a driver current $I_b$ applied to terminal "b" via the inductances 134 and 136. The circuit shown in FIG. 5 is operable such that when CR1 and CR2 are biased to have relatively low RF resistance, the diodes CR3 and CR4 are biased to have relatively high RF resistance and the bi-polar attenuator provides minimum attenuation at output terminal 138 without signal inversion. When diodes CR1 and CR2, on the other hand, are biased to exhibit relatively high RF resistance, diodes CR3 and CR4 are biased to exhibit a relatively low RF resistance, and the bi-polar network provides minimum attenuation with signal inversion. When all four diodes CR1, CR2, CR3 and CR4 are biased to have equal RF resistance, the bridge is balanced and maximum attenuation is provided at terminal 138 which couples to either signal line 94 or 96 shown in FIG. 4.

The terminal "a" and "b" of the bi-polar attenuators are connected to respective driver circuits 90 and 92, one of which is shown in FIG. 6. As shown in FIG. 6, the driver circuit 90 includes an I driver control voltage input terminal 140 which receives a control signal from the I driver control output terminal 142 of the complex correlator shown in FIG. 7. The driver circuit 90 further includes a first pair of transistors $Q_1$ and $Q_2$ coupled to a resistor-diode network 142 including diodes CR5, CR6, and CR7 and a second pair of transistors $Q_3$ and $Q_4$ coupled to a second resistor-diode network 144 including diodes CR8, CR9 and CR10. Transistors $Q_1$ and $Q_3$ operate as emitter-follower transistors with the drive currents $I_a$ and $I_b$ emanating from the collectors of transistors $Q_2$ and $Q_4$, respectively. An operational amplifier 145 is inserted between the input terminal 140 and the emitter-follower $Q_3$ in order to provide a unity again inverting amplifier and thus provide currents $I_a$ and $I_b$ whose variations are of mutually opposite polarity.

The resistor-diode networks 142 and 144 connected in the emitters of transistors $Q_2$ and $Q_4$ provide non-linear shaping of the control currents $I_a$ and $I_b$, respectively, to compensate for the non-linear control characteristics of the PIN diodes CR1 ... CR4 of the bi-polar attenuator 86. The level of the I driver control input voltage applied to the input terminal 140 controls the output current of the drive transistors $Q_2$ and $Q_4$ in order to vary the RF attenuation exhibited by the bi-polar attenuator 86. It should be noted, however, that the resistor-diode networks 142 and 144 each include a variable resistor 146 and 148, respectively, which are used to set the current values of $I_a$ and $I_b$ for maximum RF attenuation when the amplitude of the control voltage applied to terminal 140 is substantially mid-way in its input range, for example, if the input voltage varies from 1 to 5 volts, the resistors 146 and 148 are adjusted to provide for maximum attenuation when the control voltage is in the region of 2.5 to 3 volts. Additionally, transistors $Q_2$ and $Q_4$ are powered from a +6 V supply which is turned on only when the transmitter section 20 (FIG. 2) is enabled. The circuit configurations for the bi-polar attenuator 88 and the driver 92 are identical and their operation is the same as described above and therefore need not be repeated.

Referring now to FIG. 7, the I and Q driver control voltages for the complex weight circuit 66 shown in FIG. 3 are derived by a weight control unit 68 which consists of a circuit which implements a complex correlation between the I and Q quadrature components of the reference signal REF taken from the coupler 102 and 104 (FIG. 4), and the error signal taken from the coupler 72 shown in FIG. 3. Accordingly, as shown in FIG. 7, the in-phase I and quadrature Q components of the reference signal REF from the complex weighting circuit are applied to input terminals 110 and 112 while the error signal from the coupler 72 is applied to input terminal 150. The error signal input is connected to a power divider 152 which provides output signal lines 154 and 156 which respectively are connected to a pair of signal mixers 158 and 160 along with I and Q components of the reference signal REF. As shown, mixer 158 is adapted to correlate the I component while the mixer 160 is adapted to correlate the Q component. In addition, a DC bias is applied to the mixers 158 and 160 at terminals 162 and 164, respectively, so that the output therefrom which appears on signal leads 166 and 168 rides on a DC level corresponding to the amplitude of the bias voltage applied to the mixers. The output of the I component mixer 158 is fed to an operational amplifier 170 which includes a low pass filter network 172 coupled in a feedback arrangement around the amplifier. Accordingly, the driver control signal for the in-phase I driver circuit 90 shown in FIG. 4 is coupled from output terminal 142 to the I driver control input terminal 140 of FIG. 4. Additionally, operational amplifier 170 includes a grounded variable resistance element 174 which provides a DC offset adjustment for the level of the output control voltage appearing at terminal 142. In a like manner, the quadrature Q component of the reference signal REF which is correlated in the mixer 160 is applied to an operational amplifier 176 having the filter feedback network 178 coupled thereto to provide a filtered amplified driver signal to the Q component driver 92 shown in FIG. 4 by a suitable connection of terminal 144 and as shown in FIG. 7 to terminal 141 shown in FIG. 4. DC offset adjustment of the output from the amplifier 176 is provided by means of the grounded variable resistance element 180. Also both operational amplifiers 170 and 176 are operated as differential amplifiers which have their respective + inputs connected to a reference voltage of +3 V applied to terminals 182 and 184, respectively, and are adapted to drive the output signal amplitude and phase from complex weighting circuit 66 to the values needed to cancel the retransmitted signal.

Thus what has been shown and described is an in-band non-sampling real-time VHF radio repeater/relay transceiver for use in two-way multi-hop remote sensor data links which includes unique interference cancellation circuitry which operates to prevent the high level transmitted signal produced by the transmitter section of the transceiver from desensitizing the low noise RF amplifier located in the front of the receiver section of the transceiver.

While the invention has been particularly shown and described with reference to a preferred embodiment thereof, it is to be understood from the foregoing that other changes and modifications in the form and details may be made without departing from the spirit and scope of the invention as set forth in the subtended claims.

What is claimed is:

1. Radio apparatus for operating as a signal repeater for the relaying of information signals from one location to another over a network, comprising:
   co-located receiver and transmitter means coupled to a common antenna and being operable such that RF signals received by said receiver means are retransmitted without substantial delay from said transmitter means and wherein said receiver means includes RF input amplifier means, and further includes a first adaptive interference signal cancellation means coupled between said common antenna and said RF input amplifier means for preventing RF signals being currently retransmitted from rendering said receiver means unresponsive to concurrently received RF signals, and further including a second adaptive interference signal cancellation means coupled to the output of said RF input amplifier means to cancel any residue of interference signals not cancelled by said first adaptive interference signal cancellation means, whereby said receiver and transmitter means may be simultaneously operated without signal interference between one another thereby permitting near continuous use of both said receiver and transmitter means at a substantially 100% duty cycle.

2. The radio apparatus as defined by claim 1 wherein said receiver means and said transmitter means have respective operational frequencies which are offset with respect to one another.

3. The radio apparatus as defined by claim 2 wherein saisd receiver means includes circuit means for down-converting said received RF signals of a predetermined frequency band to IF signals, and
   wherein said transmitter means includes circuit means for being coupled to said IF signals and including means for up-converting said IF signals to RF signals having a frequency which is in the same said frequency band but offset with respect to the frequency of said received RF signals.

4. The radio apparatus as defined by claim 3 wherein said transmitter means includes variable attenuator means coupled to said antenna for selectively varying the power of the retransmitted RF signals from said antenna.

5. The radio apparatus as defined by claim 3 wherein said receiver means additionally includes received RF signal presence detector means which is operable to operationally enable said transmitter means upon receiving RF signals at said receiver means.

6. The radio apparatus as defined by claim 1 wherein said transmitter means retransmits received RF signals at a different frequency in the same frequency band from the frequency of the received RF signals.

7. The radio apparatus as defined by claim 6 wherein the frequency of the received RF signals and the frequency of the retransmitted RF signals are in the VHF frequency band.

8. The radio apparatus as defined by claim 1 wherein said first adaptive interference signal cancellation means includes:
   first circuit means for providing a composite input RF signal including the received RF signal from said antenna along with any undesired cross-coupled RF signals being retransmitted by said transmitter means and any RF signals reflected from the surrounding locality of said antenna;
   second circuit means for providing an RF reference signal from the RF signals being coupled to said antenna for retransmission by said transmitter means;
   third circuit means for adaptively adjusting the phase and amplitude of said RF reference signal to effect cancellation of said undesired cross-coupled RF signals when combined with said composite input RF signal; and
   fourth circuit means coupled to said first and third circuit means for algebraically combining said composite input RF signal and the adaptively adjusted RF reference signal to substantially effect said cancellation.

9. The radio apparatus as defined by claim 8 wherein said third circuit means includes means for adjusting the phase and amplitude of said RF reference signal in response to an error signal, and wherein said fourth circuit means includes means for generating said error signal in response to the summation of said composite input RF signal and said adaptively adjusted RF reference signal, and means for feeding said error signal back to said third circuit means.

10. The radio apparatus as defined by claim 9 wherein said third circuit means includes: complex weighting circuit means and complex weighting control circuit means for controlling said weighting circuit, said control circuit means being responsive to said error signal and said RF reference signal provided by said second circuit means to provide control signals to said weighting circuit.

11. The radio apparatus as defined by claim 10 wherein said complex weighting circuit includes means coupled to said second circuit means for developing in-phase and quadrature component signals from said RF reference signal, first and second bi-polar attenuator circuit means and respective driver circuit means therefore coupled to said in-phase and quadrature component signals, said driver circuit means being coupled to and responsive to control signals from said complex control circuit means to vary the attenuator characteristic of said first and second bi-polar attenuator circuit means in response to said error signal, and combiner circuit means coupled to the outputs of said first and second bi-polar attenuator circuit means and circuit means coupling said combiner circuit means to said fourth circuit means whereby cancellation is effected by summing the output signal of said combiner circuit means with said composite input RF signal.

12. The radio apparatus as defined by claim 11 wherein said complex weighting control circuit means comprises a complex correlator including means responsive to said error signal to provide in-phase and quadrature component error signals therefrom, first and second signal mixers being respectively coupled to said in-phase and said quadrature component error signals together with said in-phase and said quadrature component signals of said RF reference signal to provide an in-phase component control signal and a quadrature component control signal for respectively controlling said first and second bi-polar attenuation circuit means.

13. The radio apparatus as defined in claim 12 and additionally including first and second amplifier means respectively coupled to the output of said first and second signal mixers for providing in-phase and quadrature control signals respectively to driver circuit means coupled to said first and second bi-polar attenuator circuit means.

14. The radio apparatus as defined by claim 13 and additionally including lowpass filter circuit means coupled to said first and second amplifier means.

15. The radio apparatus as defined by claim 14 wherein said transmitter means is operative at a different RF frequency in the same frequency band from the operative RF frequency of said receiver means.

16. The radio apparatus as defined by claim 15 wherein said frequency band comprises the VHF frequency band.

* * * * *